Patented June 19, 1951

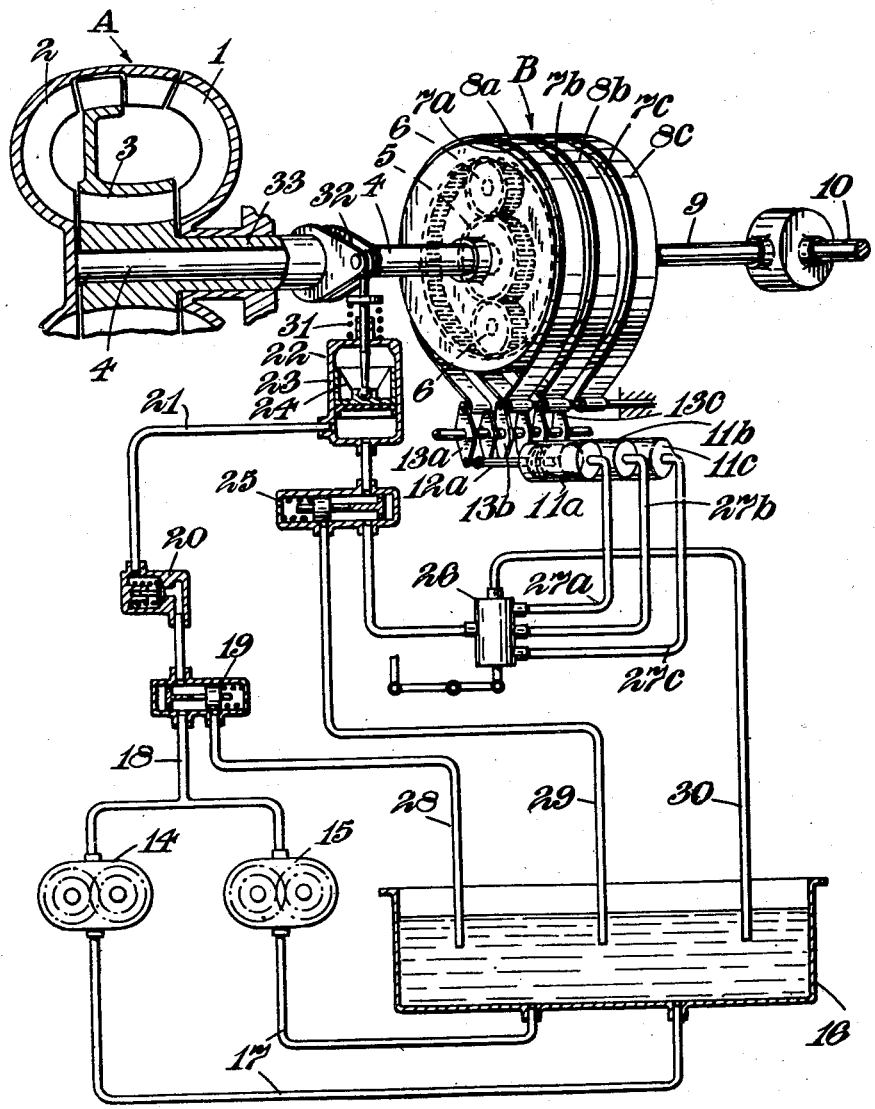

2,557,421

UNITED STATES PATENT OFFICE 2,557,421

HYDRAULIC POWER-TRANSMISSION SYSTEM

Harold Ivan Frederick Evernden, Hazelwood, Duffield, near Derby, England, assignor to Rolls-Royce Limited, Derby, England, a British company Application September 24, 1946, Serial No. 698,989 In Great Britain October 20, 1944

Section 1, Public Law 690, August 8, 1946 Patent expires October 20, 1964

11 Claims. (Cl. 74—731)

This invention relates to power-transmission systems of the type comprising a hydraulic torque-converter. If it is required to render available the maximum power of the engine at output speeds which are below the speed at which maximum power is obtainable from the engine, it is necessary to use also a change-speed reduction gear between the torque-converter and the load. A hydraulic torque-converter comprises an impeller and a turbine element arranged in a closed circuit with one or more reaction members interposed in the circuit; the function of a reaction member is to change the direction of the working fluid and it is therefore subjected to a force or torque which normally is taken by the stationary casing.

According to this invention there is provided in a hydraulic power-transmission system of the kind described, the combination with a reaction member so mounted as to be free to move in the direction of the fluid forces acting on it, of means coupling it to a frictional controlling element, such as a clutch or brake, in the change-speed-gear in such manner that the movement of the reaction member augments the operating pressure of the frictional element.

According to another feature of this invention the power-transmission system may comprise a hydraulic control for the change-speed-gear, and there is then provided in combination with the hydraulic controlling circuit, a pressure-intensifier connected on the supply side of the change-speed-gear operating mechanism and operated by the reaction member.

The pressure-intensifier may be constituted by a cylinder connected to the hydraulic circuit, with a non-return valve between it and the supply, and a piston in the cylinder coupled to the reaction member and movable thereby to apply pressure to the liquid in the cylinder.

A specific embodiment of the present invention will now be described by way of example with reference to the accompanying drawing which shows in diagrammatic form a hydraulic power transmission system in accordance with the present invention as applied to a motor vehicle.

The hydraulic power transmission system generally comprises a torque-converter A, a change-speed gear generally indicated at B and a hydraulic control for the change-speed gear. The torque-converter comprises an impeller 1 and a turbine element 2 arranged in a closed circuit with a reaction member 3 interposed therein. The turbine element 2 is coupled to an output shaft 4 which is connected to the sunwheel 5 of the change-speed gear B comprising a plurality of epicyclic gear trains. The transmission shaft 9 to the back axle 10 of the vehicle is coupled to the planetary gears 6 in known manner and the annular gears 7a, 7b, 7c of the gear trains are controlled by tightening one of brake bands 8a, 8b, 8c, on the respective annular gear so that when the brake is applied the desired speed reduction is obtained from the gear.

The epicyclic reduction gear B shown in the accompanying drawing is capable of providing three reduction ratios and accordingly a corresponding number of epicyclic gears and brake bands are provided as shown. Each brake band is operated by an associated hydraulic motor, referenced 11a, 11b, 11c respectively, whereof the plungers, of which only one 12a is illustrated, are connected through respective linkages 13a, 13b, 13c each, with one end of the associated brake band 8a, or 8b or 8c the other end of which is carried by a stationary member. Oil under pressure is supplied to the hydraulic motors 11a, 11b, 11c under the control of a suitable valve as hereinafter described.

The operating pressure for the hydraulic motors 11a, 11b, 11c is derived from two pumps 14 and 15 the former of which is driven by the turbine shaft 4 and the latter from some parts associated with the back axle 10 of the vehicle so that a supply of pressure fluid is available when the vehicle is in motion independent of the source of supply from pump 14 due to the drive from the engine. The suction side of the pumps 14 and 15 are connected with an oil reservoir 16 by means of pipe lines 17 and the delivery side of the pumps is connected by means of a common pipe line 18 with a relief valve 19 and a non-return valve 20, the latter being connected by pipe line 21 with a pressure-intensifier generally indicated by the reference numeral 22. The pressure-intensifier consists of a cylinder 23 with a piston 24 therein as hereinafter described. The pressure oil passes from the intensifier 22 through a relief valve 25 which is loaded to a substantially higher pressure than the relief valve 19 and is then directed to the control valve 26 for the various hydraulic motors 11a, 11b, 11c which control the change-speed gear B. The pressure fluid passes from the control valve 26 to the hydraulic motors by way of pipe lines 27a, 27b, 27c respectively whilst fluid exhausting from the hydraulic motors is returned to the valve 26 by one of said pipe lines 27a, 27b and 27c and is then returned to the reservoir 16 by pipe 30. Fluid discharged from the relief valves 19, 25 is similarly returned to the reservoir by means of pipes 28, 29 respectively. The pressure-intensifier 22 has its piston 24 controlled by a spring 31 so that the piston is normally at the upper end of the cylinder 23. The piston is connected to a radial arm 32 mounted on a shaft 33 which carries the reaction member 3 of the torque-converter A. The arrangement is such that the reaction movement of member 3 due to the fluid forces acting on it is transmitted through shaft 33 and the radial arm 32 to the piston 24 to push it down in the cylinder 22.

The operation of the device is as follows:

On adjusting the control valve 26 oil under pressure is admitted to one of the hydraulic motors 11a, 11b or 11c the valve being set to a position to select the motor which is to be operated so that its associated brake band 8a, 8b or 8c is brought into frictional engagement with one or other of the annular gear members 7a, 7b or 7c. The pressure of the oil delivered to the hydraulic motor as described is determined by the relief valve 19 and results in the brake 8 being applied so that drive is taken up through the epicyclic gear and transmission commences from the torque-converter A to the transmission shaft 9 and back axle 10. As the drive is taken up by the gear the reaction from the torque-converter reaction member 3 increases and being transmitted by shaft 33 and arm 32 to the piston 24 it forces the latter down in the cylinder 23 thereby increasing the pressure on the oil. This pressure is held by the non-return valve 20 and is therefore delivered through the more highly loaded relief valve 25 to the valve 26 and the operative hydraulic motor 11a, or 11b or 11c so that the pressure applied to the brake by the latter is increased. This increase is of value particularly in the case in which the operative brake 8a, 8b, or 8c has to provide a gear reduction torque as well as to cope with the increase in torque which is given by the torque-converter A. When the speed of the vehicle has been increased to such a point that there is little or no torque conversion in the torque-converter A the torque reaction derived from its torque reaction member 3 will have diminished to something approaching zero and the engine torque arising in the reduction gear A being substantially less is satisfactorily dealt with by the pressure due to the pumps 14, 15 alone.

It will be seen that with this arrangement the maximum oil pressure to be supplied from the pumps 14, 15 can be substantially reduced or alternatively the leverage required for actuation of the operative brake 8a, 8b, or 8c can be reduced or the benefit can be distributed between these two factors.

It will be appreciated that the operation of the device outlined above takes place irrespective as to which brake band is applied to the change-speed gear.

While a particular construction embodying a pressure-intensifier for hydraulic operation of the gear control has been described, the invention is not limited thereto, since various other means, such as a mechanical coupling, may be used to apply the pressure from the reaction member of the torque-converter to the frictional element of the change-speed gear.

I claim:

1. A hydraulic power transmission comprising an input shaft, a hydraulic torque converter having an impeller, a turbine element and a reaction member arranged in a closed hydraulic circuit, the reaction member being free to move in the direction of the fluid forces acting on it and the impeller being connected to the input-shaft, an output shaft driven by the turbine element, a driven shaft, an epicyclic gear train interconnecting said output shaft and said driven shaft and comprising a brake member arranged to be applied frictionally to an element of said epicyclic gear train to render said gear train operative, and hydraulic operating means for said brake member comprising a pressure-liquid source, a piston member arranged to be displaced by the pressure liquid and arranged to apply the brake member to operate said element of the epicyclic gear train, a pressure-intensifier connected between the pressure-liquid source and said piston member, the pressure-intensifier comprising a cylinder through which the pressure liquid passes and a piston connected to the reaction member and movable in said cylinder by the reaction member to apply pressure to the liquid in the cylinder, a relief valve between the pressure-intensifier and the piston member connected to the friction member, a non-return valve between the pressure liquid source and the pressure-intensifier, and a relief valve between the pressure liquid source and the non-return valve.

2. A hydraulic power-transmission as claimed in claim 1, comprising a shaft carrying said reaction member, a radial arm on said shaft connected to the piston of the pressure-intensifier to displace said piston in the cylinder.

3. A hydraulic power-transmission comprising an input shaft, a hydraulic torque-converter having an impeller, a turbine element and a reaction member arranged in a closed hydraulic circuit, the reaction member being free to move in the direction of the fluid forces acting on it and the impeller being connected to the input-shaft, an output shaft driven by the turbine element, a driven shaft, a plurality of epicyclic gear trains interconnecting said output shaft and said driven shaft, a plurality of brake members, one for each epicyclic gear train, arranged to be applied frictionally to an element of its associated epicyclic gear train to render that gear train operative and a hydraulic operating circuit for said brake members comprising a pressure-liquid source, a plurality of piston members to be displaced by the pressure liquid and connected one to each brake member to operate it, valve means to direct the pressure liquid selectively to said piston members, a pressure-intensifier connected in said hydraulic operating circuit between the pressure-liquid source and said piston members, the pressure-intensifier comprising a cylinder through which the pressure liquid passes and a piston connected to the reaction member and movable in said cylinder by the reaction member to apply pressure to the liquid in the cylinder, a relief valve between the pressure-intensifier and the piston members connected to the brake members, a non-return valve between the pressure-liquid source and the pressure-intensifier, and a relief valve between the pressure-liquid source and the non-return valve.

4. A hydraulic power transmission as claimed in claim 3, comprising a shaft carrying said reaction member, a radial arm on said shaft connected to the piston of the pressure-intensifier to displace said piston in the cylinder.

5. A hydraulic power-transmission comprising an input shaft, a hydraulic torque-converter having an impeller, a turbine element and a reaction member arranged in a closed hydraulic circuit, the reaction member being free to move in the direction of the fluid forces acting on it and the impeller being connected to the input shaft, an output shaft driven by the turbine element, a driven shaft, an epicyclic gear train interconnecting said output shaft and said driven shaft, a brake member arranged to be applied frictionally to an element of said epicyclic gear train to render said gear train operative, and a hydraulic operating circuit for said brake member comprising a pressure-liquid source, a piston member to be displaced by the pressure liquid and connected to the brake member to operate it, a pressure-intensifier between the pressure-liquid source and said piston member, the pressure-intensifier comprising a cylinder through which the pressure liquid passes and a piston connected to the reaction member and movable in said cylinder by the reaction member to apply presssure to the liquid in the cylinder, a non-return valve between the pressure-liquid source and the pressure-intensifier, and a relief valve between the pressure-liquid source and the non-return valve.

6. A hydraulic power-transmission comprising an input shaft, a hydraulic torque-converter having an impeller, a turbine element and a reaction member arranged in a closed hydraulic circuit, the reaction member being free to move in the direction of the fluid forces acting on it and the impeller being connected to the input shaft, an output shaft driven by the turbine element, a driven shaft, a plurality of epicyclic gear trains interconnecting said output shaft and said driven shaft, a plurality of brake members, one for each epicyclic gear train and each arranged to be applied frictionally to an element of its associated epicyclic gear train to render that gear train operative, and a hydraulic operating circuit to operate said brake members comprising a pressure-liquid source, a plurality of piston members to be displaced by the pressure liquid and connected one to each brake member to operate it, valve means to direct the pressure liquid selectively to said piston members, a pressure-intensifier between the pressure-liquid source and said piston members, the pressure-intensifier comprising a cylinder through which the pressure liquid passes and a piston connected to the reaction member and movable in said cylinder by the reaction member to apply pressure to the liquid in the cylinder, a non-return valve between the pressure-liquid source and the pressure-intensifier, and a relief valve between the pressure-liquid source and the non-return valve.

7. A hydraulic power transmission comprising an input shaft, a hydraulic torque-converter having an impeller, a turbine element and a reaction member arranged in a closed hydraulic circuit, the reaction member being free to move in the direction of the fluid forces acting on it and the impeller being connected to the input shaft, an output shaft driven by the turbine element, a driven shaft, an epicyclic gear train interconnecting said output shaft and said driven shaft, a brake member arranged to be applied frictionally to an element of said epicyclic gear train to render said gear train operative, and a hydraulic operating circuit for said brake member comprising a pressure-liquid source, a piston member to be displaced by the pressure liquid and connected to the brake member to operate it, a pressure-intensifier between the pressure-liquid source and said piston member, the pressure-intensifier comprising a cylinder through which the pressure liquid passes and a piston connected to the reaction member and movable in said cylinder by the reaction member to apply pressure to the liquid in the cylinder, and a non-return valve between the pressure-liquid source and the pressure-intensifier.

8. A hydraulic power-transmission comprising an input shaft, a hydraulic torque-converter having an impeller, a turbine element and a reaction member arranged in a closed hydraulic circuit, the reaction member being free to move in the direction of the fluid forces acting on it and the impeller being connected to the input-shaft, an output shaft driven by the turbine element, a driven shaft, a plurality of epicyclic gear trains interconnecting said output shaft and said driven shaft, a plurality of brake members, one for each epicyclic gear train, each arranged to be applied frictionally to an element of said epicyclic gear train to render said epicyclic gear train operative and a hydraulic operating circuit for said brake members comprising a pressure-liquid source, a plurality of piston members to be displaced by the pressure liquid and connected one to each brake member to operate it, valve means to direct the pressure liquid selectively to said piston members, a pressure-intensifier between the pressure-liquid source and said piston members, the pressure-intensifier comprising a cylinder through which the pressure liquid passes and a piston connected to the reaction member and movable in said cylinder by the reaction member to apply pressure to the liquid in the cylinder, and a non-return valve between the pressure-liquid source and the pressure-intensifier.

9. In a power-transmission comprising a hydraulic torque-converter having an impeller, a turbine element and a reaction member arranged in a closed hydraulic circuit, the reaction member being free to move in the direction of the fluid forces acting on it, an input shaft arranged to drive said impeller, and a change-speed gear arranged to transmit a drive from said turbine element which change-speed gear comprises a plurality of epicyclic gear trains and a plurality of brake members, one for each epicyclic gear train, each brake member being arranged to be applied frictionally to an element of its associated epicyclic gear train to render that epicyclic gear train operative to transmit the drive; hydraulic means operative to load said brake members and comprising a pressure-liquid source, a plurality of hydraulic motors connected one to each brake member to load it, control valve means arranged to be operated selectively to connect said hydraulic motors with said pressure-liquid source, a non-return valve connected between said pressure-liquid source and said control valve means, a relief valve connected between said non-return valve and said pressure-liquid source to limit the pressure of said pressure-liquid source to a first value, a cylinder connected hydraulically between said non-return valve and said control valve means, a piston arranged to be displaced in said cylinder by said reaction member of the torque-converter and by such displacement to increase the fluid pressure applied through said hydraulic motors to the brake members beyond the value determined by said pressure-liquid source by an amount dependent on the reaction from said reaction member of the torque converter.

10. An arrangement as claimed in claim 9, comprising also a second relief valve arranged between said cylinder and said control valve means, said relief valve being set to operate at a pressure substantially in excess of said first value.

11. In a power-transmission comprising a hydraulic torque-converter having an impeller, a turbine element and a reaction member, and a change-speed gear comprising a plurality of epicyclic gear trains arranged to be rendered operative by brake members applied to rotatable elements of the gear trains, there being a separate brake member for each epicyclic gear train; hydraulic means arranged to load said brake members into frictional engagement with said rotatable elements and including a pressure-intensifier arranged to be operated from said reaction member of said torque-converter to apply to said brake members an operating pressure which is dependent on the reaction from said torque-converter reaction member.

HAROLD IVAN FREDERICK EVERNDEN.

REFERENCES CITED

The following references are of record in the file of this patent:

UNITED STATES PATENTS

| Number | Name | Date |
|---|---|---|
| 2,161,008 | Bonn | June 6, 1939 |
| 2,205,470 | Dunn | June 25, 1940 |
| 2,337,748 | Gsching | Dec. 28, 1943 |
| 2,349,937 | Buchhart | May 20, 1944 |